United States Patent [19]

Selcuk

[11] 4,449,514
[45] May 22, 1984

[54] SOLAR CONCENTRATOR PROTECTIVE SYSTEM

[75] Inventor: M. Kudret Selcuk, La Canada, Calif.

[73] Assignee: The United States of America as represented by the Administrator of the National Aeronautics and Space Administration, Washington, D.C.

[21] Appl. No.: 392,103

[22] Filed: Jun. 25, 1982

[51] Int. Cl.³ .............................................. F24J 3/02
[52] U.S. Cl. ................................... 126/418; 126/438; 126/440
[58] Field of Search ............... 126/418, 438, 439, 451, 126/440, 422; 60/641.15

[56] References Cited

U.S. PATENT DOCUMENTS

| | | | |
|---|---|---|---|
| 528,255 | 10/1894 | Monks et al. | 126/438 |
| 1,951,403 | 3/1934 | Goddard | 126/440 X |
| 4,158,356 | 6/1979 | Wininger | 126/438 |
| 4,265,223 | 5/1981 | Miserlis et al. | 126/438 X |
| 4,335,578 | 6/1982 | Osborn et al. | 126/418 X |
| 4,373,512 | 2/1983 | Hirt | 126/418 |

*Primary Examiner*—Larry Jones

*Attorney, Agent, or Firm*—Paul F. McCaul; Thomas H. Jones; John R. Manning

[57] ABSTRACT

A system is described for use with a solar concentrator such as a parabolic dish type that concentrates solar radiation onto a small opening (18) of a receiver, for protecting the receiver in certain circumstances, including tracking failure wherein the concentrated solar radiation would fall on the face plate (26) surrounding the receiver opening and burn it, or in the event of lack of coolant circulation which could cause burning of the receiver cavity walls (22). The protective system includes a shutter mechanism (30) stored in an open configuration beside the receiver opening and operable in case of failure to close shutters (34) over the opening, while also moving the mechanism away from the opening and closer to the dish concentrator so that only less concentrated solar radiation must be blocked by the shutter mechanism. The shutter mechanism can include a fuse wire (52) having one portion surrounding the receiver opening and another portion which supports the shutter mechanism against moving towards its closed position. A tracking failure causes concentrated sunlight to strike the fuse wire to break it and allow the shutter mechanism to move towards a closed position.

8 Claims, 10 Drawing Figures

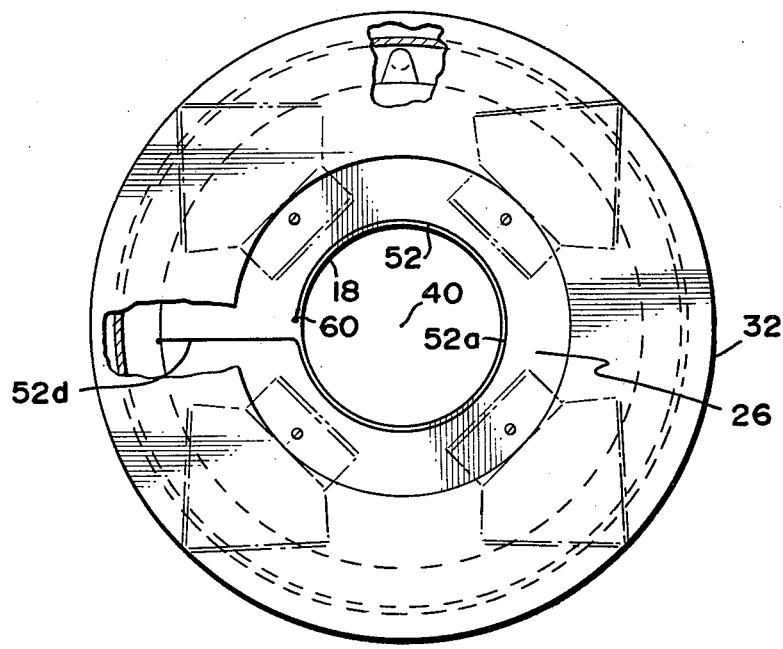
FIG. 4
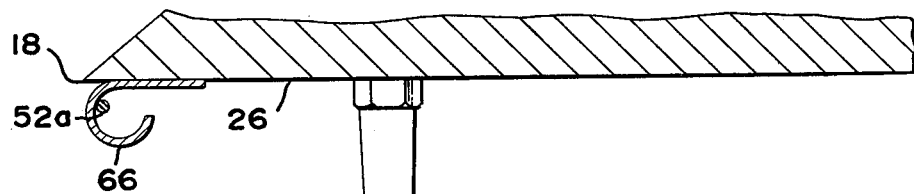
FIG. 5
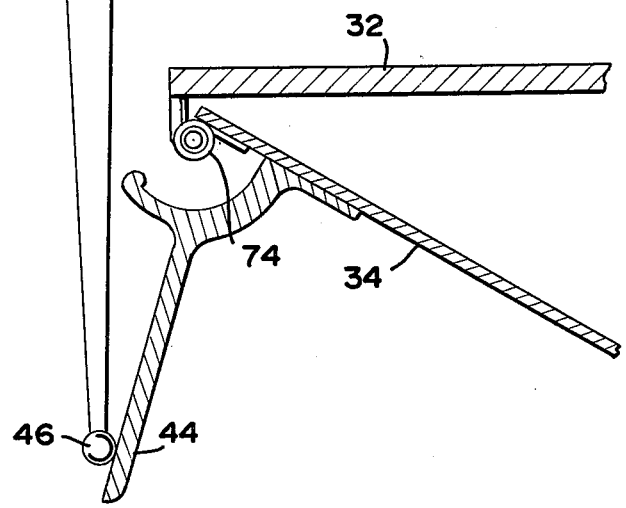

SOLAR CONCENTRATOR PROTECTIVE SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

One type of solar collector includes a concentrator, such as a parabolic dish reflector, which forms a concentrated image of the sun onto the opening of a receiver. The concentrated solar radiation heats tubes within the receiver chamber that carry water or other working fluid. If the concentrated image of the sun strikes the receiver face plate, due to a tracking failure or a major error in alignment, then the face plate may be burned. Similarly, if working fluid in the receiver tubes is lost, or circulation stops because of a pump failure, the tubes can be damaged because of overheating. A relatively simple apparatus that could protect the receiver against damage in the event of such failures, while avoiding interference with normal operation of the concentrator system, would be of conconsiderable value.

SUMMARY OF THE INVENTION

In accordance with one embodiment of the present invention, a protective system is provided for use with a solar concentrator, for protecting the receiver in the event of tracking or other failure, which is relatively simple and which avoids interference with normal operation. The protective system includes a shutter mechanism, and apparatus for storing the shutter mechanism in an open configuration near the receiver during normal operation. Upon the occurrence of a failure that could cause damage to the receiver from concentrated solar radiation, the apparatus moves the shutter mechanism away from the receiver opening and towards the concentrator, and closes the shutter mechanism at its position away from the receiver opening. As a result, solar radiation falling on the shutter mechanism is much less concentrated than it would be at the receiver opening, to avoid burning of the shutter mechanism.

The apparatus can include a low melting temperature fuse extending immediately around the receiver opening, so that deviating concentrated solar radiation breaks the fuse. The fuse is also extended beside the coolant-carrying tubes in the receiver cavity. A mechanism responsive to breaking of the fuse can operate the shutter mechanism to close it. The shutter mechanism can includes a shutter frame movable by gravity away from the receiver, and carrying devices for moving shutter elements to a closed position as the shutter frame moves under the force of gravity towards its closed position. The fuse can include a wire that normally supports the shutter frame from moving, but which releases the shutter frame to move upon breaking of the wire by the concentrated image of the sun.

The novel features of the invention are set forth with particularity in the appended claims. The invention will be best understood from the following description when read in conjunction with the accompanying drawings.

BRIEF DESCRIPTION OF THE DRAWINGS

FIG. 4 is a view taken on the line 4—4 of FIG. 3.

FIG. 5 is a view in greater detail, of a portion of the system of FIG. 3.

DESCRIPTION OF THE PREFERRED EMBODIMENTS

Figure 1:
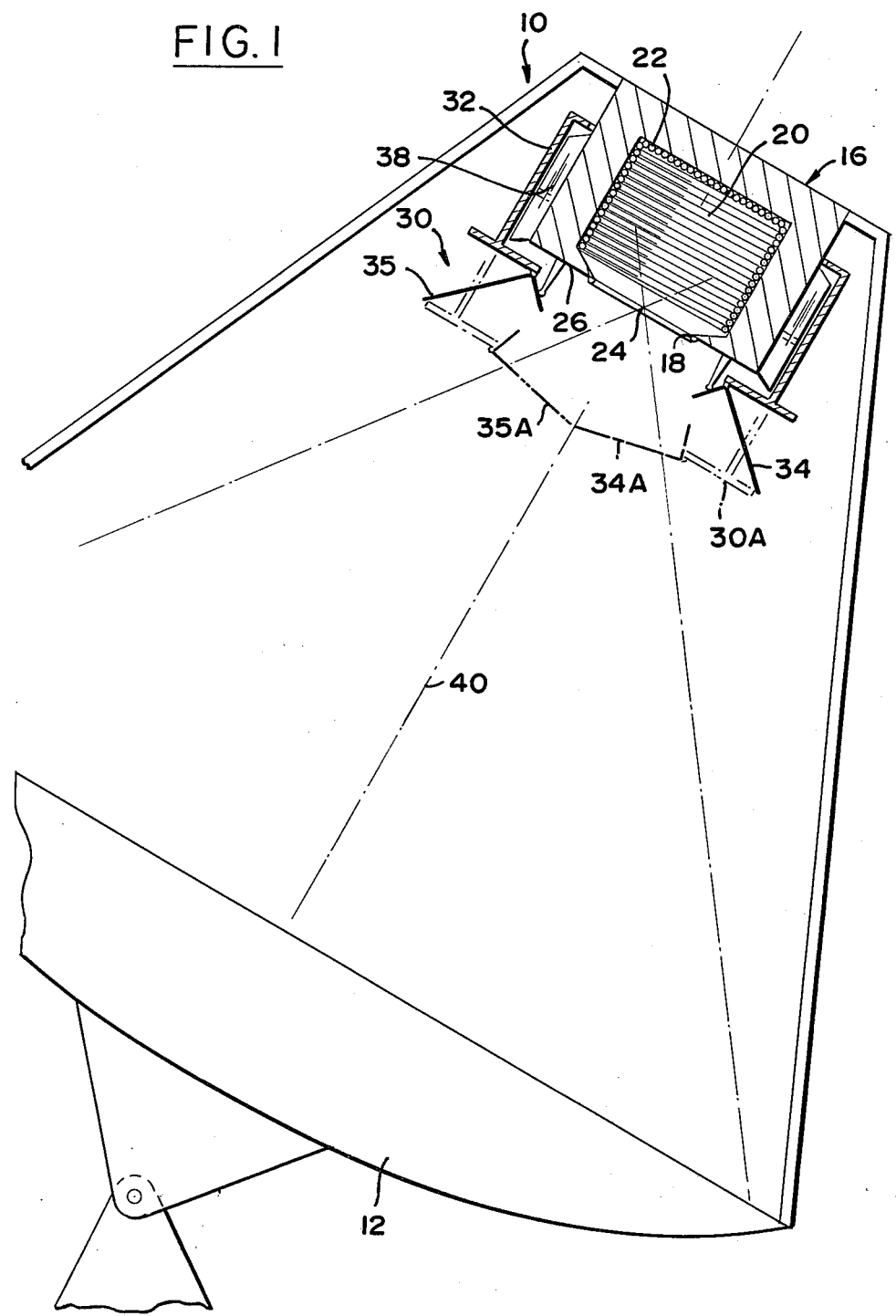
FIG. 1 is a sectional side view of a solar concentrator system which includes the protective apparatus of the present invention shown in solid lines in an open position.

FIG. 1 illustrates a solar concentrator system 10 which includes a reflector dish concentrator 12 and a receiver 16. The receiver has an opening 18 through which concentrated solar radiation is received in a cavity 20, to heat a group of tubes 22 through which a cooling fluid passes, as to turn such a fluid into steam for generating electrical power. The concentrator 12 forms a concentrated image of the sun at a position 24 that is even with the opening 18 of the receiver. If there were a large tracking error or the tracker stopped functioning, the image would be concentrated on a face plate 26 of the receiver and burn it.

Figure 2:
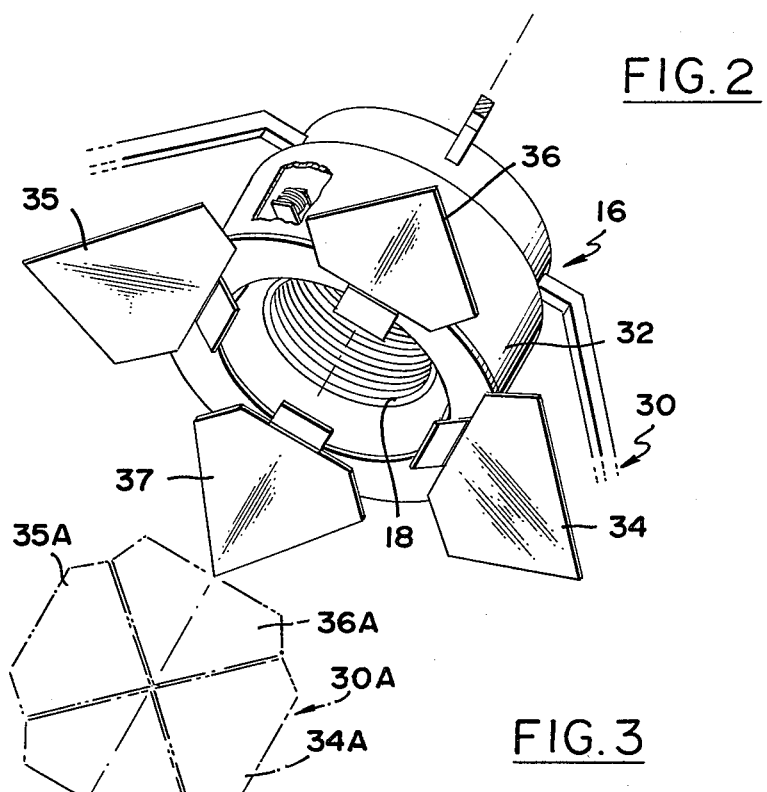
FIG. 2 is a partial perspective view of the system of FIG. 1, shown in an open position in solid lines, and in a closed position in phantom lines.

A shutter mechanism 30 is provided to safeguard the receiver face plate 26 from burning in the event of a tracking error which causes the concentrated image of the sun to fall outside of the opening 18 of the receiver. The mechanism includes a shutter frame 32 which carries several shutter elements 34-36. Three guides 38 are mounted on the outside of the receiver to guide the shutter frame in movement toward and away from the dish concentrator 12. During normal operation of the system, the shutter elements are stored in the open configuration shown in solid lines in FIGS. 1 and 2. However, when solar radiation deviates sufficiently to damage the face plate 26, the shutter mechanism is operated to pivot the four shutter elements to a closed configuration, and to move them at a downward incline along the axis 40 towards the concentrator 12. The fully closed shutter mechanism is shown at 30A, with the shutter elements such as 34A, 35A in a closed configuration.

Figure 3:
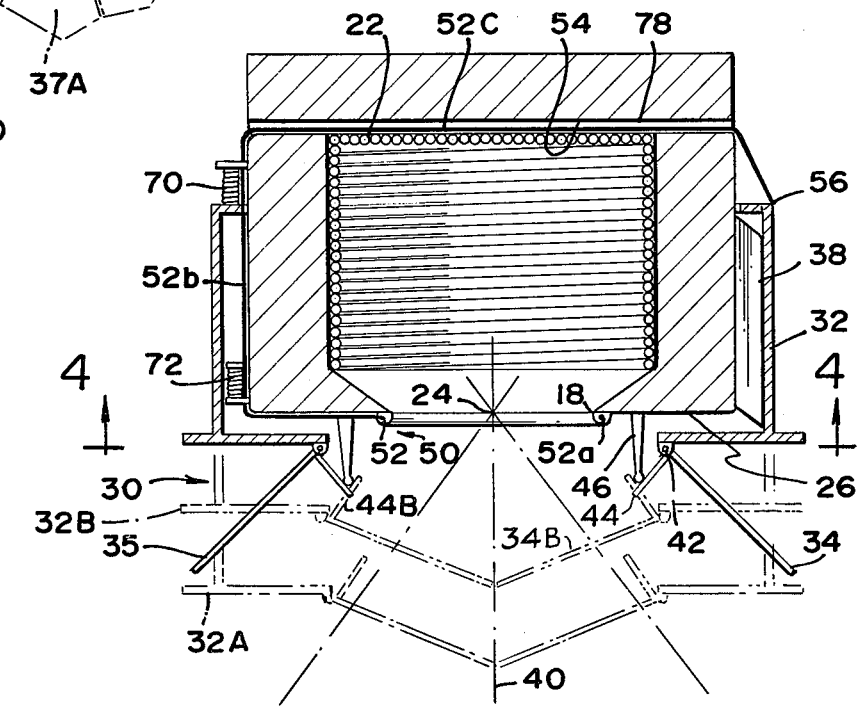
FIG. 3 is a more detailed sectional view of a portion of the system of FIG. 1.

As shown in FIG. 3, each shutter element such as 34 is pivotally mounted on a bearing 42 that is mounted on the shutter frame 32. A cam follower 44 is fixed to the shutter element 34. The cam follower 44 engages a cam 46 mounted on the receiver. As the shutter frame 32 moves downwardly towards the concentrator, as to the position 32B, the cam follower 44 can pivot as to the position 44B to allow the shutter element to pivot towards a closed position at 34B. Even after the shutter elements are closed, the shutter frame continues to move, to the position 32A with the shutter elements in their fully closed position.

The sensing apparatus 50 for sensing when the concentrated sun image has deviated far enough from the central position 24 to endanger the face plate 26, includes a fuse wire 52. The wire 52 includes a portion 52a which extends in largely a circle around the receiver opening 18, so that the deviating sun image can heat the fuse wire 52 to melt and break it. The fuse wire includes a portion 52b that extends near the outside of the receiver and another portion 52c which extends through a passage 54 in the receiver. The fuse wire portion 52b is attached at 56 to the shutter frame 32. So long as the fuse wire is intact, it prevents the shutter frame 32 from moving downwardly along the centerline 40 towards the concentrator to close the shutter mechanism. However, if any portion of the fuse wire, including the portion 52a that extends around the receiver opening 18 or the portion 52c, is broken, then tension in the fuse wire drops and it cannot support the shutter frame 32. The fuse wire 52 then acts as a release means that releases the shutter frame to move downwardly to the position 32A to close the shutter mechanism.

As shown in FIG. 4, one end 60 of the fuse wire 52 is anchored to the face plate, and the wire portion 52a extends therefrom in a circle around the receiver opening 18. At the other end of the fuse wire portion 52a is a radially extending wire portion 52d that extends out and then up along the receiver. As shown in FIG. 5, the fuse wire portion 52a which extends around the receiver opening 18, is enclosed by a heat shield 66. The heat shield prevents melting of the fuse if sunlight is applied for only a short period of time during a sun acquisition period when the concentrator is turned to point towards the sun. In one example, the face plate 26 is formed of copper, which melts at 1086° C., and the shutter frame 32 is formed of steel which melts at above 1500° C. The fuse wire at 52a can be formed of aluminum which melts at about 500° C.

If the concentrated solar radiation dwells sufficiently long on the face plate that the fuse wire portion 52a melts, then the shutter frame 32 is released to begin moving at a downward incline. Three compressed springs 70 (FIG. 3) spaced about the apparatus, push the shutter frame to begin its movement, and further movement continues under the force of gravity. It is possible to use a long spring or other actuator that forces the shutter frame to move along its entire travel path, although use of gravity to accomplish this simplifies the apparatus. At the end of downward movement, the flange 56 of the shutter frame encounters three stops 72 spaced about the apparatus that prevent any further movement. During the downward movement, torsion springs 74 (FIG. 5) coupled to each of the shutters such as 34, force the shutters to pivot towards a closed position as the corresponding cam followers 44 move relative to the cams 46.

The use of shutter frame movement towards the reflector concentrator 12 (FIG. 1) to close the mechanism, not only provides a simple mechanism for closing the shutter elements 34–37, but also avoids excessive heating of the shutter elements. This is because the image of the sun which is highly concentrated at 24, is considerably less concentrated when it falls on the closed shutter elements at 34A–37A. The closed shutter mechanism at 30A should be spaced from the receiver opening 18 by at least the width of the receiver opening, as measured along the axis 40. For large tracking errors, wherein the focal point 24 would approach the periphery of the face plate 26, the positioning of the closed shutter mechanism away from the face plate also serves to block solar radiation reflected from most of the dish concentrator 12, from reaching any point on the face plate 26.

Another source of danger to the solar concentrator system is damage to the receiver tubes 22 in the event that there is loss of working fluid or in the event of pump failure, so that the tubes overheat. The same shutter mechanism 30 can be used to cover the receiver opening in the event of such a failure, by constructing it to release the shutter frame upon overheating of the inside walls of the receiver chamber. This is accomplished by including the fuse wire portion 52c extending adjacent to the receiver tubes and in series with the rest of the fuse wire, including the fuse wire portion 52a that surrounds the receiver opening. The fuse wire portion 52c is of a material having a lower melting temperature than the receiver tubes, to melt before the tubes melt.

Figure 6:
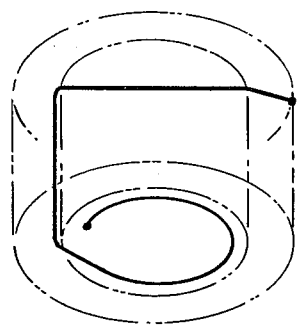
FIGS. 6 through 9 illustrate various fuse wire configurations that can be used in the system of FIGS. 1 through 5.
Figure 8:
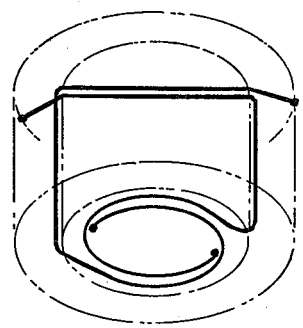
Figure 7:
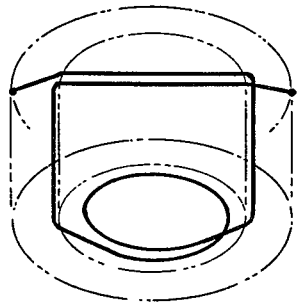
Figure 9:
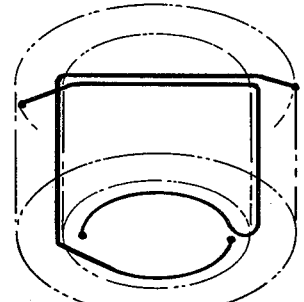

FIGS. 6 through 9 illustrate various configurations of fuse wires for sensing tracking failure and coolant circulation failure. FIG. 6 illustrates a single wire, full loop configuration used in the system of FIGS. 1–5. Fig. 7 illustrates a single wire, double loop configuration. FIG. 8 illustrates a two wire, full loop configuration. FIG. 9 illustrates a two wire, half loop configuration.

Figure 10:
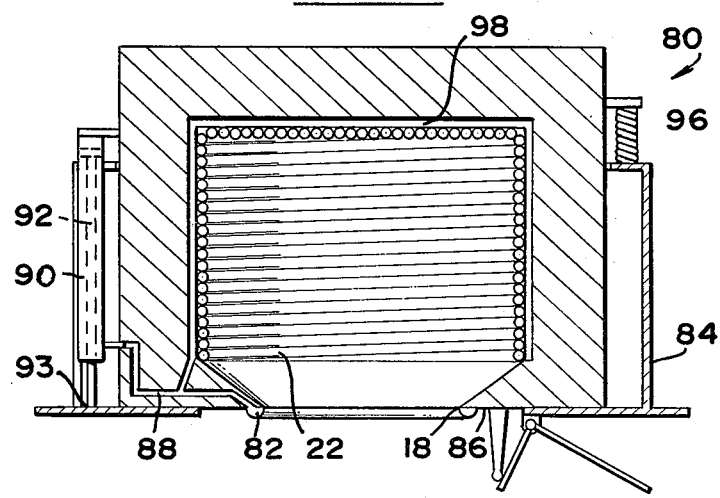
FIG. 10 is a partial sectional view of a solar concentrator system constructed in accordance with another embodiment of the invention.

FIG. 10 shows another solar concentrator protective system 80 which utilizes a sensing or fuse tube 82 of low melting temperature material such as aluminum and containing a pressured gas. The tube surrounds the receiver opening 18, to release a shutter mechanism frame 84 in the event of tracking failure or coolant circulation failure that would otherwise burn the face plate 86 or coolant tubes 22. The tube 82 is connected through a connecting tube 88 to a cylinder 90 containing pressured gas. A piston 92 fixed to the shutter frame at 93, can move along the cylinder 90 only if the pressure therein drops. In the event of a tracking error, concentrated solar radiation will melt a hole in the sensing tube 82, allowing gas to flow out of the cylinder 90, to allow the shutter frame 84 to move downwardly. An actuator 96 can be included to urge the shutter frame 84 to move down. An additional sensing tube 98 lying adjacent to the receiver tubes 22, contains compressed gas and is connected to the connecting tube 88 that leads to the cylinder 90. In the event of overheating of receiver tubes 22, the sensing tube 98 will melt and release gas before the receiver tubes 22 are severely damaged. The sensing tubes could be utilized to contain a vacuum or pressured gas.

Thus, the invention provides a solar concentrator protective system which shields the receiver from concentrated solar radiation in the event of system failure, using a sensing and shuttering mechanism of relatively simple construction. The shutter mechanism is stored in an open configuration near the receiver and beside it to avoid blocking the opening of the receiver. Upon system failure, the shutter mechanism moves towards the concentrator and closes to block solar radiation from the receiver opening or the region immediately thereabout. Such movement results in the shutter elements being closed at a position where only partially concentrated solar radiation is encountered, so that the shutter elements themselves are not burned. The movement of the shutter element also enables a relatively simple mechanism to be utilized that moves the shutter elements to their closed position, using cams on the receiver to operate cam followers on the shutter mechanism. The sensing of the tracking error can be accomplished by an easily meltable sensor extending in a circle immediately about the receiver opening, such a fuse wire or gas-filled tube. A similar sensor can be placed adjacent to the heat transfer tubes within the receiver to close the shutter mechanism in the event of lack of circulation of working fluid to the tubes.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In a solar concentrator system which includes a solar radiation receiver with an opening and a concentrator which concentrates solar radiation onto said receiver opening, the improvement of a protective system for blocking solar radiation comprising:
   a shutter mechanism including at least one shutter, said mechanism moveable between open and closed configurations; and
   means for storing said shutter mechanism near said receiver and in an open configuration to avoid blocking the receiver opening, and for moving said shutter mechanism toward said concentrator to a second position spaced from said receiver opening by at least about the width of said receiver opening, as measured along an imaginary centerline that connects the middle of said concentrator and said receiver opening, and closing said shutter mechanism and holding it closed at said second position, whereby to reduce the concentration of solar radiation on the shutter in the closed configuration.

2. In a solar concentrator system which includes a solar radiation receiver with an opening and a concentrator which concentrates solar radiation onto said receiver opening, the improvement of a protective system for blocking solar radiation comprising:
   a shutter mechanism releaseable to move from an open configuration to a closed configuration; and
   means for releasing said shutter mechanism including a wire having a fuse portion extending around the receiver opening so the fuse portion can be broken by concentrated sunlight falling thereon, and means responsive to breaking of said fuse portion for releasing said shutter mechanism to move to said closed configuration.

3. In a solar concentrator system which includes a light receiver with an opening and a concentrator which concentrates solar radiation onto said receiver opening, the improvement of a protective system for blocking solar radiation comprising:
   a shutter mechanism which includes a plurality of shutter elements moveable between a closed position to block said receiver opening against the passage of solar radiation from said concentrator and an open position to allow such passage of solar radiation; and
   means responsive to concentrated solar radiation from said concentrator, deviating from said receiver opening, for repositioning said shutter mechanism from said open position to said closed position, said repositioning means including a low temperature melting fuse extending immediately around said receiver opening so that deviating concentrated solar radiation melts said fuse to break it, and means responsive to breaking of said fuse for moving said shutter mechanism to said closed position.

4. The improvement described in claim 3 wherein: said fuse includes a wire of a material which melts at a lower temperature than the walls of said receiver that surround said receiver opening, and said means responsive to breaking of said fuse is constructed to apply tension to said wire and release said shutter mechanism to close upon the loss of wire tension resulting from breaking of the wire.

5. The improvement described in claim 3 wherein: said fuse includes a tube which extends about said receiver opening and which melts at a lower temperature than the walls of said receiver that surround said receiver opening, said tube containing gas at a pressure different than that of the ambient atmosphere, and said means responsive to breaking of said fuse is constructed to release said shutter mechanism to close upon a change in gas pressure in said tube.

6. In a solar concentrator system which includes a solar radiation receiver with an opening and a concentrator which concentrates solar radiation onto said receiver opening, the improvement of a protective system for blocking solar radiation comprising:
   a shutter mechanism including at least one shutter, said mechanism moveable between open and closed configurations; and
   means for storing said shutter mechanism near said receiver and in an open configuration to avoid blocking the receiver opening, and for moving said shutter mechanism toward said concentrator to a second position and closing said shutter mechanism and holding it closed at said second position;
   said shutter mechanism includes a shutter frame moveable toward said concentrator and a plurality of shutter elements pivotally mounted on said frame to pivot between open and closed positions, each element including a cam follower, said shutter mechanism also including a plurality of cams mounted on said receiver and positioned to pivot said cam followers to close said shutter elements as said frame moves toward said concentrator.

7. In a solar concentrator system which includes a solar radiation receiver with an opening and a concentrator which concentrates solar radiation onto said receiver opening, the improvement of a protective system for blocking solar radiation comprising:
   a shutter mechanism releaseable to move from an open configuration to a closed configuration;
   said receiver includes a chamber and a plurality of tubes for carrying cooling fluid positioned at the inside wall of said chamber; and
   means for releasing said shutter mechanism including a fuse of lower melting temperature material than said tubes lying adjacent to said chamber inside walls, so the fuse is melted when cooling fluid does not flow at a sufficient rate through said tubes, while concentrated sunlight heats them, and means responsive to breaking of said fuse for releasing said shutter mechanism.

8. In a solar concentrator system which includes a solar radiation receiver with an opening and a concentrator which concentrates solar radiation onto said receiver opening, the improvement of a protective system for blocking solar radiation comprising:
   a main frame supporting said concentrator and receiver with said receiver above said concentrator when said concentrator faces upward toward the sky, said receiver having a guideway;

a shutter mechanism including a shutter frame moveable along said guideway, said main frame holding said guideway to confine said shutter frame to movement toward and away from said concentrator;

retainer means connected between said main frame and said shutter frame for supporting said shutter frame against moving along said guideway, said retainer means responsive to the beginning of receiver overheating for releasing said shutter frame to move along said guideway;

said shutter mechanism including a plurality of shutter elements and cam elements, some of said elements mounted on said shutter frame and other elements mounted on said receiver, said cam elements positioned to move said shutter elements from open to closed positions as said shutter frame moves down along said guideway.

* * * * *